(12) United States Patent
St. Romain, II

(10) Patent No.: US 11,615,268 B2
(45) Date of Patent: Mar. 28, 2023

(54) SYSTEM AND METHOD FOR OPTIMIZING PERFORMANCE OF A MODEL PERFORMING A DOWNSTREAM TASK

(71) Applicant: Toyota Research Institute, Inc., Los Altos, CA (US)

(72) Inventor: Randall J. St. Romain, II, Dexter, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 331 days.

(21) Appl. No.: 17/015,760

(22) Filed: Sep. 9, 2020

(65) Prior Publication Data

US 2022/0076064 A1    Mar. 10, 2022

(51) Int. Cl.
| | |
|---|---|
| *G06V 10/22* | (2022.01) |
| *G06V 20/56* | (2022.01) |
| *G06V 20/64* | (2022.01) |
| *G06K 9/62* | (2022.01) |

(52) U.S. Cl.
CPC ......... *G06K 9/6256* (2013.01); *G06K 9/6218* (2013.01); *G06K 9/6262* (2013.01); *G06V 10/22* (2022.01); *G06V 20/56* (2022.01); *G06V 20/64* (2022.01)

(58) Field of Classification Search
None
See application file for complete search history.

(56) References Cited

U.S. PATENT DOCUMENTS

| | | | |
|---|---|---|---|
| 7,826,736 B2 | 11/2010 | Strandemar et al. | |
| 2010/0157280 A1 | 6/2010 | Kusevic et al. | |
| 2020/0349362 A1* | 11/2020 | Maloney | G01S 5/16 |
| 2021/0374547 A1* | 12/2021 | Wang | G06N 3/0472 |
| 2022/0012916 A1* | 1/2022 | Srinivasan | G06V 20/58 |

OTHER PUBLICATIONS

Unknown, "Camera-LIDAR Fusion Sensor," Sensing Technology, 7 pages, 2020, https://global.kyocera.com/ces/sensing-technology/ (last accessed Sep. 2, 2020).
Xie et al., "Online Active Calibration for a Multi-LRF System," 2015 IEEE 18th International Conference on Intelligent Transportation Systems, pp. 806-811 (2015).
(Continued)

*Primary Examiner* — Idowu O Osifade
(74) *Attorney, Agent, or Firm* — Christopher G. Darrow; Darrow Mustafa PC

(57) ABSTRACT

A system for optimizing the performance of at least one downstream task includes one or more processors and a memory having one or more modules. The one or more modules cause the one or more processors to generate visual semantic segmentation data of a scene by a visual semantic segmentation model, generate labeled point cloud data of the scene by a vision model based on raw point cloud data of the scene and the visual semantic segmentation data, generate one or more clusters of the scene by a cluster generator model based on the labeled point cloud data, determine a clustering loss error between the one or more clusters generated by the cluster generator and one or more ground truth clusters and adjust, based on the clustering loss error, one or more model weights the visual semantic segmentation model and/or the vision model.

20 Claims, 7 Drawing Sheets

(56) References Cited

OTHER PUBLICATIONS

Barz et al., "Computational Modelling and Prediction of Gaze Estimation Error for Head-mounted Eye Trackers," German Research Center for Artificial Intelligence (DFKI), pp. 1-10 (2015).
Taylor et al., "Automatic Calibration of Lidar and Camera Images Using Normalized Mutual Information," In Robotics and Automation (ICRA), 2013 IEEE International Conference on May 2013, 8 pages.
Iyer et al., "CalibNet: Geometrically Supervised Extrinsic Calibration using 3D Spatial Transformer Networks," 8 pages, arXiv: 1803.08181v2 [cs.RO] Aug. 4, 2019.
Behbahani et al., "Learning from Demonstration in the Wild," 9 pages, arXiv:1811.03516v2 [cs.LG] Mar. 26, 2019.
Kato et al., "Reinforcement Learning of Speech Recognition System Based on Policy Gradient and Hypothesis Selection," 5 pages, arXiv:1711.03689v1 [cs.CL] Nov. 10, 2017.

\* cited by examiner

SYSTEM AND METHOD FOR OPTIMIZING PERFORMANCE OF A MODEL PERFORMING A DOWNSTREAM TASK

TECHNICAL FIELD

The subject matter described herein relates, in general, to systems and methods for optimizing the performance for at least one downstream task and, more specifically, to downstream tasks related to object detection.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have one or more sensors that are capable of detecting the environment surrounding the vehicle. These sensors may include radar sensors, sonar sensors, camera sensors, and/or light detection and ranging (LIDAR) sensors. LIDAR sensors generate data in the form of a point cloud that indicates the distance to the surface of an object in a three-dimensional space. In some cases, camera sensors can be utilized to generate similar data, commonly referred to as pseudo-LIDAR data. As such, these sensors allow an object detection system to detect the presence of objects operating within the environment. The detection of objects by an object detection system can be utilized by other systems, such as vehicle safety systems and autonomous and/or semi-autonomous driving systems.

In order to detect objects, some object detection systems utilize one or more models, which may be neural networks that have been trained using any one of several different training methodologies, such as supervised training. Supervised training of a neural network may require the use of ground truth data, sometimes referred to as training data. Supervised learning is the machine learning task of learning a function that maps an input to an output based on example input-output pairs It infers a function from labeled training data consisting of a set of training examples. In supervised learning, each example is a pair consisting of an input object and the desired output value. A supervised learning algorithm analyzes the training data and produces an inferred function, which can be used for mapping new examples.

However, in order to train these neural networks, the training data must be generated. The generation of training data may be particularly tedious and laborious, thus limiting the amount of training data available to train these neural networks. Additionally, especially with regards to point cloud data, training data is even more difficult to generate as point clouds could have thousands or even hundreds of thousands of points all needing to be properly annotated.

SUMMARY

This section generally summarizes the disclosure and is not a comprehensive explanation of its full scope or all its features.

In one embodiment, a system for optimizing the performance of at least one downstream task includes one or more processors and a memory in communication with the one or more processors. The memory may include a visual semantic segmentation module, a point cloud labeling module, a clustering generator module, and a training module. The visual semantic segmentation module has instructions that, when executed by the one or more processors, cause the one or more processors to generate visual semantic segmentation data of a scene by a visual semantic segmentation model based on at least one image of the scene.

The point cloud labeling module includes instructions that, when executed by the one or more processors, cause the one or more processors to generate labeled point cloud data of the scene by a vision model based on raw point cloud data of the scene and the visual semantic segmentation data. The clustering generator module includes instructions that, when executed by the one or more processors, cause the one or more processors to generate one or more clusters of the scene by a cluster generator model based on the labeled point cloud data.

The training module includes instructions that, when executed by the one or more processors, cause the one or more processors to determine a clustering loss error between the one or more clusters generated by the cluster generator and one or more ground truth clusters. Using this clustering loss, the training module adjusts one or more model weights of the visual semantic segmentation model and/or the vision model. As such, the downstream task of generating a cluster of the scene is optimized by adjusting the model weights of one or more upstream models.

In another embodiment, a method for optimizing the performance of at least one downstream task includes the steps of generating visual semantic segmentation data of a scene by a visual semantic segmentation model based on at least one image of the scene, generating labeled point cloud data of the scene by a vision model based on raw point cloud data of the scene and the visual semantic segmentation data, generating one or more clusters of the scene by a cluster generator model based on the labeled point cloud data, determining a clustering loss error between the one or more clusters generated by the cluster generator and one or more ground-truth clusters, and adjusting, based on the clustering loss error, one or more model weights the visual semantic segmentation model and/or the vision model.

In yet another embodiment, a non-transitory computer-readable medium comprising instructions for optimizing the performance of at least one downstream task that, when executed by one or more processors, cause the one or more processors to generate visual semantic segmentation data of a scene by a visual semantic segmentation model, generate labeled point cloud data of the scene by a vision model based on raw point cloud data of the scene and the visual semantic segmentation data, generate one or more clusters of the scene by a cluster generator model based on the labeled point cloud data, determine a clustering loss error between the one or more clusters generated by the cluster generator and one or more ground truth clusters and adjust, based on the clustering loss error, one or more model weights the visual semantic segmentation model and/or the vision model.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for optimizing downstream tasks. Here, the system may be in the form of an object detection system that can detect objects in an environment using information of the environment in the form of one or more images and one or more point clouds. The images may be captured from one or more cameras. The one or more point clouds may be generated by a LIDAR sensor or may be a pseudo-LIDAR point cloud generated by one or more images captured by a camera.

Ultimately, the object detection system wants to output clusters, in the form of bounding boxes, which indicate the location of a detected object as well as the type of object. These bounding boxes are determined by observing labeled point cloud data that indicates the three-dimensional location of a point within a point cloud as well as the object type that the point is associated with. This is accomplished by essentially "painting" the point cloud with semantic segmentation data determine by a captured image of the environment.

However, the training of a neural network to generate this labeled point cloud data can be difficult because training data is difficult to generate and fairly expensive both from a cost perspective and labor requirements. As such, instead of directly training the labeled point cloud generator model and/or the visual semantic segmentation model using annotated data point cloud data and/or labeled semantic segmentation data, which may be fairly expensive, the system and method instead determines a loss between determined object clusters, which, as stated previously, may be bounding boxes. Using this loss function, the model weights of the labeled point cloud generator model and/or the visual semantic segmentation model can be adjusted to minimize this loss function. As such, the downstream process of generating proper bounding boxes is optimized, without the need for expensive training data to train upstream processes.

Figure 1:
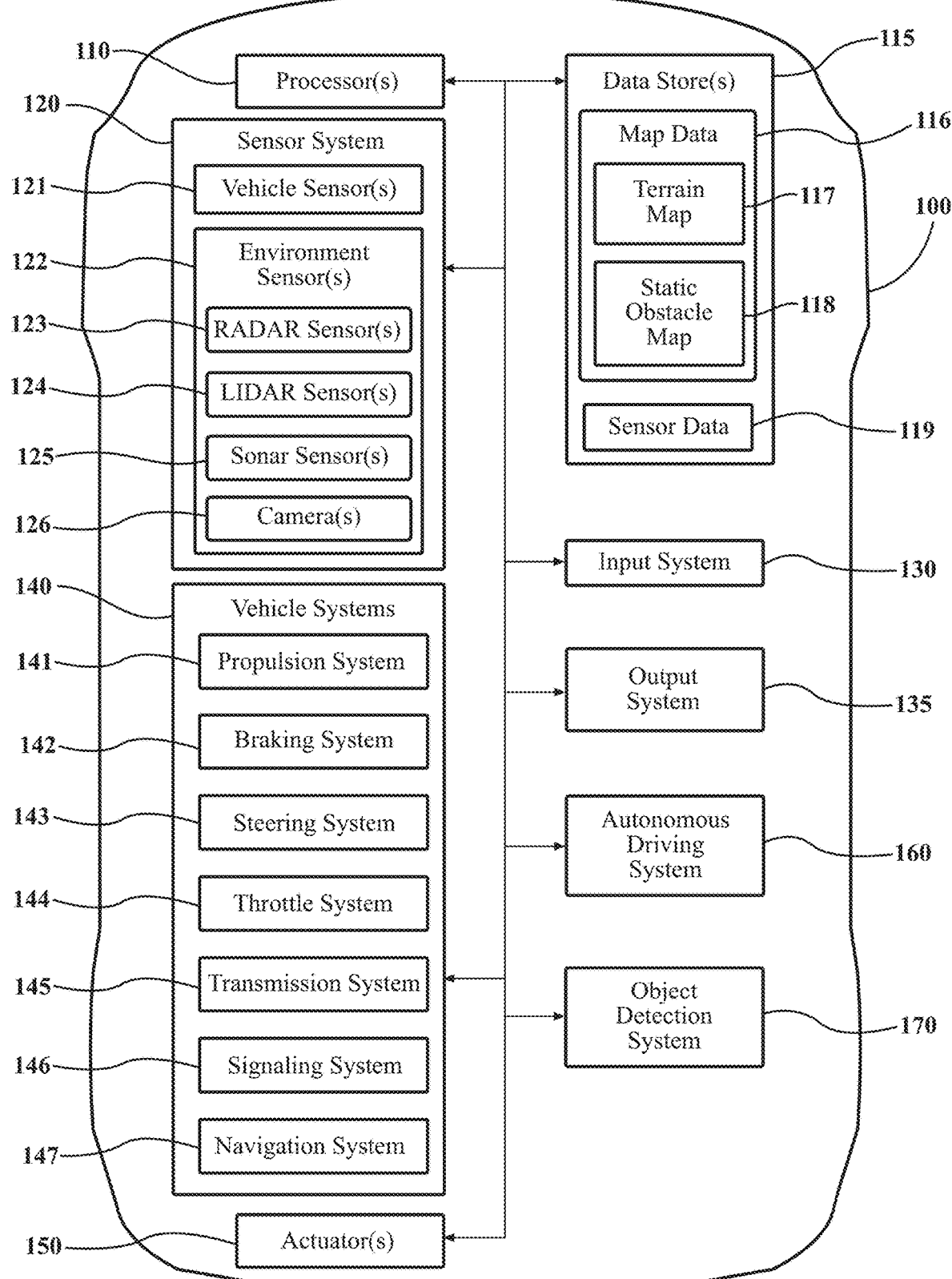
FIG. 1 illustrates a block diagram of a vehicle incorporating an object detection system that includes an optimized downstream task.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an object detection system 170. The object detection system 170 may be incorporated within the autonomous driving system 160 or may be separate as shown. Broadly, the object detection system 170 may receive information from one or more sensors, such as the environment sensor(s) 122 and output clustering information of any objects detected by the environment sensor(s) 122. The clustering information may be in the form of one or more bounding boxes that provide a location of the detected object and may also contain an object type. As such, the object detection system 170 can output the location of objects and the type of objects it has located. This information can be used by other processes, such as the autonomous driving system 160 and/or other systems, such as vehicle safety systems of the vehicle 100.

Figure 2:
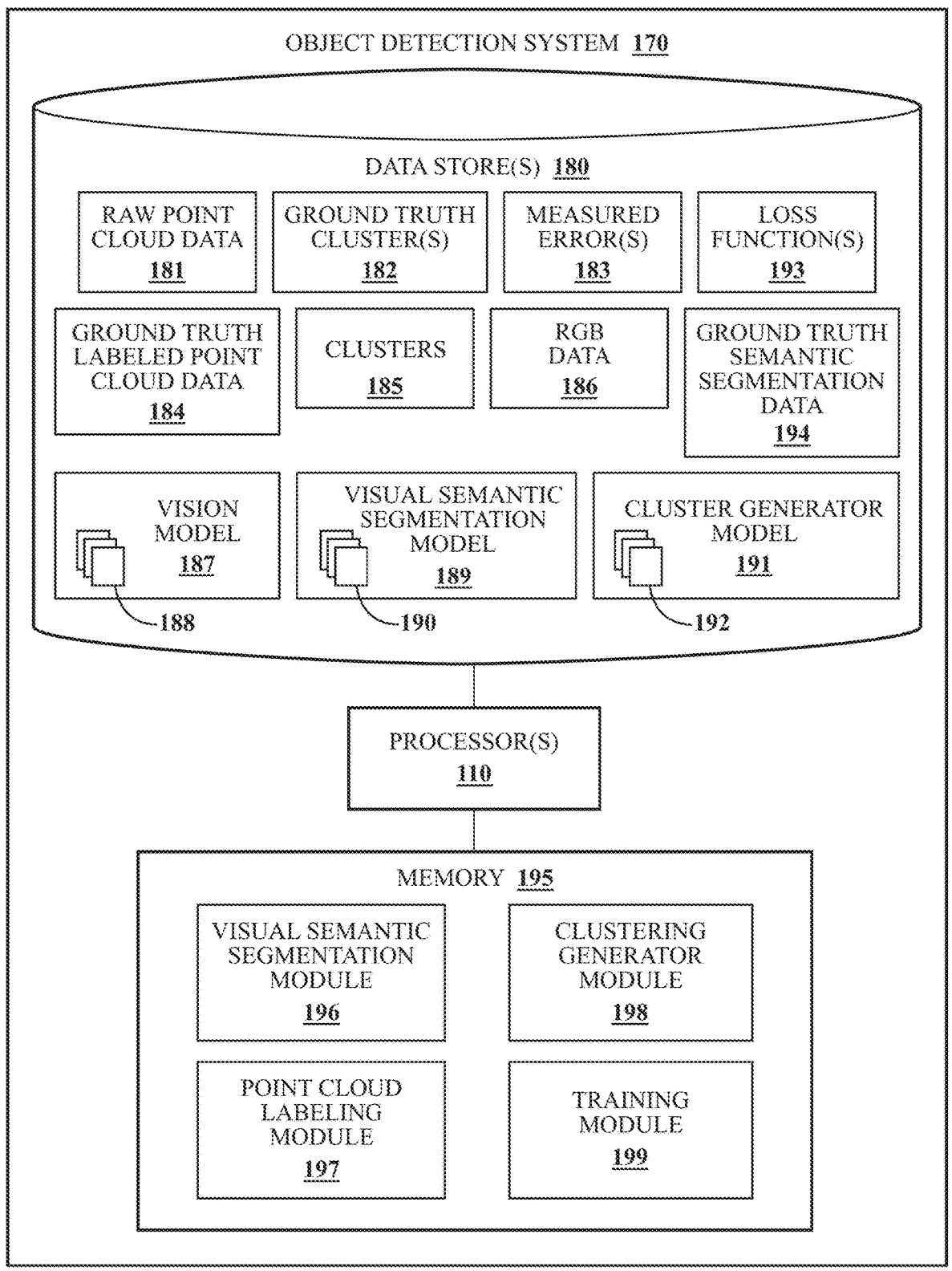
FIG. 2 illustrates a more detailed block diagram of the object detection system of FIG. 1.

With reference to FIG. 2, one embodiment of the object detection system 170 is further illustrated. As shown, the object detection system 170 includes one or more processor(s) 110. Accordingly, the processor(s) 110 may be a part of the object detection system 170, or the object detection system 170 may access the processor(s) 110 through a data bus or another communication path. In one or more embodiments, the processor(s) 110 is an application-specific integrated circuit that is configured to implement functions associated with modules 196-199. These modules may include a visual semantic segmentation module 196, a point cloud labeling module 197, a clustering generator module 198, and/or a training module 199. In general, the processor(s) 110 is an electronic processor such as a microprocessor that is capable of performing various functions as described herein. In one embodiment, the object detection system 170 includes a memory 195 that stores the modules 196-199. The memory 195 may be a random-access memory (RAM), read-only memory (ROM), a hard disk drive, a flash memory, or other suitable memory for storing the modules 196-199. The modules 196-199 are, for example, computer-readable instructions that, when executed by the processor(s) 110, cause the processor(s) 110 to perform the various functions disclosed herein.

Furthermore, in one embodiment, the object detection system 170 may include one or more data store(s) 180. The data store(s) 180 is, in one embodiment, an electronic data structure such as a database that is stored in the memory 195 or another memory and that is configured with routines that can be executed by the processor(s) 110 for analyzing stored data, providing stored data, organizing stored data, and so on. Thus, in one embodiment, the data store(s) 180 stores data used and/or generated by the modules 196-199 in executing various functions. In one embodiment, the data store(s) 180 includes raw point cloud data 181, which may be generated by the LIDAR sensor(s) 124 and/or may be in the form of pseudo-LIDAR data generated by images captured by the camera(s) 126. The data store(s) 180 may also include other information captured by the environment sensor(s) 122, such as RGB data 186 that may include one or more images captured by the camera(s) 126.

The data store(s) 180 may also include ground truth data, sometimes referred to as training data. In one example, the data store(s) 180 may include ground truth cluster(s) 182, ground truth labeled point cloud data 184, and/or ground truth semantic segmentation data 194. In addition to ground truth data, other information relating to the training of the modules 196-199 may also be stored in the data store(s) 180, such as loss information determined by loss function(s) 193, which may include measured error(s) 183. A description of this information, as well as how it is utilized to train one or more of the modules 196-199, will be given later in this description.

Further, the data store(s) 180 may also include information generated by the object detection system 170, such as cluster(s) 185, which may be in the form of one or more bounding boxes. As previously described, the cluster(s) 185 (or bounding boxes) generally describe the location of one or more detected objects and, possibly, the type of object that has been detected. As such, the object detection system 170 can output a bounding box indicating the presence (in the form of a location) of a pedestrian (in the form of an object type) that has been detected by the object detection system 170.

The data store(s) 180 may also include one or more models that are essentially neural networks that can be trained to perform several different functions. In this example, the data store(s) 180 also stores a vision model 187 that may include one or more model weights 188. The vision model 187 can output labeled point cloud data by combining raw point cloud data 181 with semantic segmentation data generated from the RGB data 186. The performance of the vision model 187 is dependent on adjustments made to the model weights 188.

The data store(s) 180 may also include a visual semantic segmentation model 189 that also includes one or more model weights 190 that affect the performance of the visual semantic segmentation model 189. The visual semantic segmentation model 189, as will be described in more detail later, can receive the RGB data 186 and generate visual semantic segmentation information.

The data store(s) 180 may also include the cluster generator model 191 that also includes one or more model weights 192 that impact the performance of the cluster generator model 191. The cluster generator model 191 can receive labeled point cloud data, which may have been generated by the vision model 187 and output the cluster(s) 185, which may be in the form of one or more bounding boxes.

With regards to the modules 196-199, the visual semantic segmentation module 196 includes instructions that, when executed by the processor(s) 110, causes the processor(s) 110 to generate visual semantic segmentation information. Moreover, semantic segmentation refers to the process of linking pixels in an image to one or more class labels. These class labels could include labels such as a vehicle, tree, ground plane, building, pedestrian, bicyclists, and the like. As such, the processor(s) 110 receives RGB data 186 that may be captured by the camera(s) 126 of a scene outside of the vehicle 100. The pixels of the image are then classified with a class label.

Figure 4:
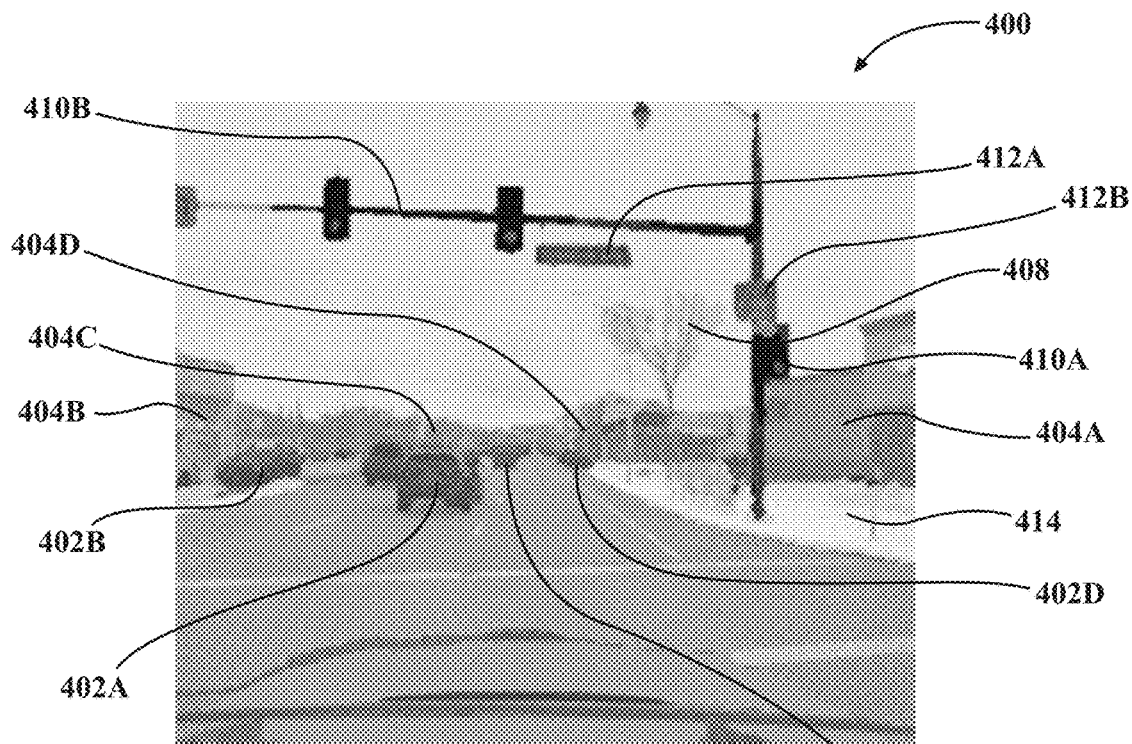
FIG. 4 illustrates visual semantic segmentation data of a scene.

For example, referring to FIG. 4, illustrated is semantic segmentation data 400 generated of an image of a scene. The visual semantic segmentation module 196 causes the processor(s) 110 to classify pixels in the semantic segmentation data 400 with a class label. As such, the pixels that form the vehicles 402A-402D have been given one class label, while the pixels that form the buildings 404A-404B have been given a different class label. The same is also true for other types of objects detected in the semantic segmentation data 400, such as the pixels that form the tree 408, the pixels that form the traffic signals 410A-410B, the pixels that form the street signs 412A-412B, and the pixels that form the sidewalk 414. As will be explained later, information from the semantic segmentation data 400 will be utilized to classify points of a point cloud.

The visual semantic segmentation module 196 may utilize a neural network, such as the visual semantic segmentation model 189. As will be explained later, the model weights 190 of the visual semantic segmentation model 189 are adjusted during a training, to improve the performance of the object detection system 170.

With regard to the point cloud labeling module 197, the point cloud labeling module 197 causes the processor(s) 110 to generate labeled point cloud data of the scene by using a vision model 187. Moreover, the vision model 187 utilizes as inputs, raw point cloud data 181 of the scene, and the visual semantic segmentation data generated by the visual semantic segmentation module 196. As stated before, the raw point cloud data 181 may be in the form of a point cloud generated by the LIDAR sensor(s) 124 but could also be in the form of pseudo-LIDAR data generated by performing one or more processes on images captured by the camera(s) 126. Moreover, in one example, pseudo-LIDAR data is generated by first capturing an image by the camera(s) 126, generating a depth map from the captured image, and then back projecting the depth map into a three-dimensional space.

Like before, the performance of the vision model 187 may be dependent on adjustments made to one or more model weights 188 of the vision model 187. As will be explained later, the model weights 188 of the vision model 187 are adjusted during a training, to improve the performance of the object detection system 170.

As is generally well known, point cloud data is essentially data that describes the location of multiple points in a three-dimensional space. The multiple points may represent the presence of a surface of one or more objects located within the three-dimensional space. The raw point cloud data 181 may include information regarding the location of the points forming the point cloud and, in some cases, also includes intensity information. Generally, it does not include information relating to what type of object is associated with each point of the point cloud.

Figure 3:
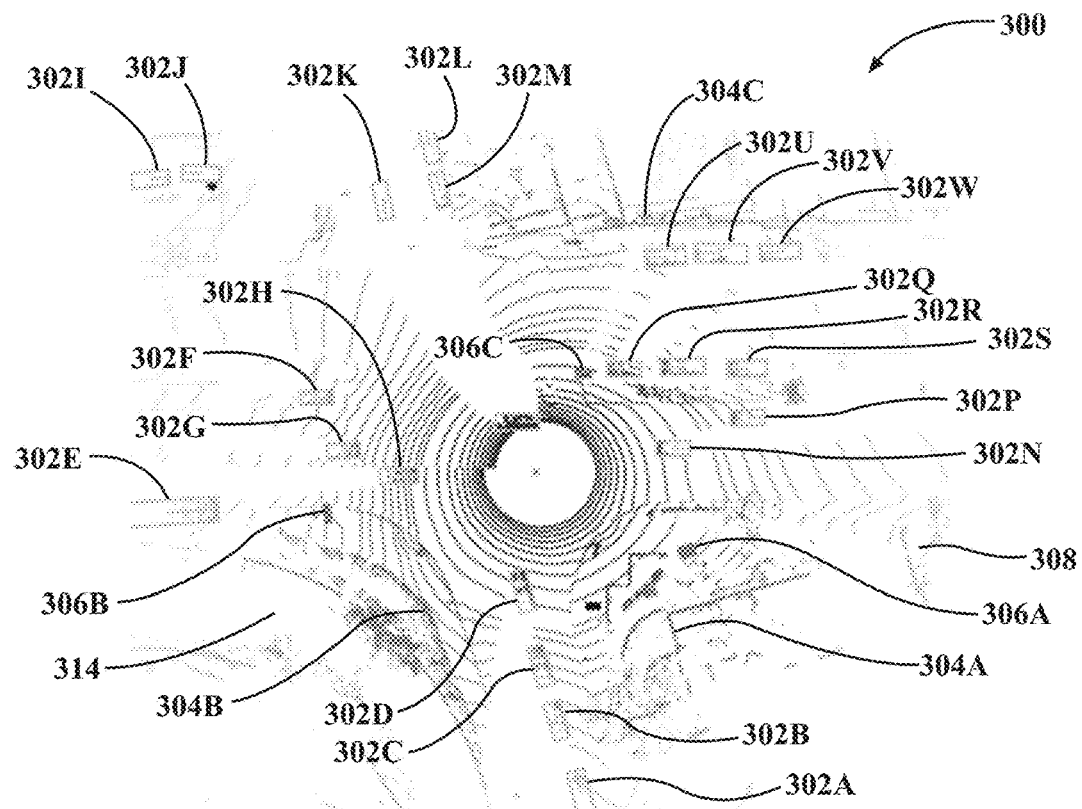
FIG. 3 Illustrates a point cloud having labeled points and clusters in the form of bounding boxes.

In order to label the raw point cloud data 181 to generate the labeled point cloud data, the vision model 187 utilizes visual semantic segmentation data, such as described in FIG. 4 to label points of the raw point cloud data 181. For example, FIG. 3 illustrates a point cloud 300. The point cloud 300 includes numerous points. In this example, bounding boxes have been generated to show the presence of moving objects, such as vehicles 302A-302W as well as pedestrians 306A and 306B. Additionally, other points in the point cloud 300 are also present, such as points relating to a tree 308, buildings 304A-304C, and a sidewalk 314.

The vision model 187 can utilize the semantic segmentation data, such as the semantic segmentation data 400, to classify one or more points of the point cloud 300. As such, the points forming the vehicles 302A-302W may be labeled with one set of class labels, while points related to the pedestrians 306A-306C may be labeled with another set of class labels. The same is also true for other types of objects in the point cloud 300, such as tree 308, the buildings 304A-304C, and the sidewalk 314.

In one example, the vision model 187 may label the points of the raw point cloud data 181 by projecting the points of the raw point cloud into a two-dimensional image that has semantic segmentation information aligned with the two-dimensional image. As such, the semantic segmentation information can be overlaid to the two-dimensional version of the raw point cloud to label points in the raw point cloud data 181. It should be understood that there are numerous different methodologies for labeling points of a point cloud using two-dimensional semantic segmentation information, such as the semantic segmentation data 400 of FIG. 4.

As such, once the point cloud labeling module 197 has completed labeling the raw point cloud data 181, a labeled point cloud will be outputted that includes the location of points that indicate the presence of the surface, but also a class label associated with the points that form the labeled point cloud.

The cluster generator module 198 includes instructions that, when executed by the processor(s) 110, causes the processor(s) 110 to generate one or more clusters of the scene by a cluster generator model 191 based on the labeled point cloud data. Moreover, the cluster generator model 191 includes one or more model weights 192 that impact the performance of the cluster generator model 191. The cluster generator model 191 receives the labeled point cloud data and then generates one or more cluster(s) 185, which may be in the form of one or more bounding boxes. The bounding boxes indicate the location of an object and also the class (or type) of the object. As such, referring back to FIG. 3, the vehicles 302A-302W each include bounding boxes that indicate the location of the vehicles in a three-dimensional space as well as a class label—in this case—that the bounding boxes relate to vehicles.

Figure 5:
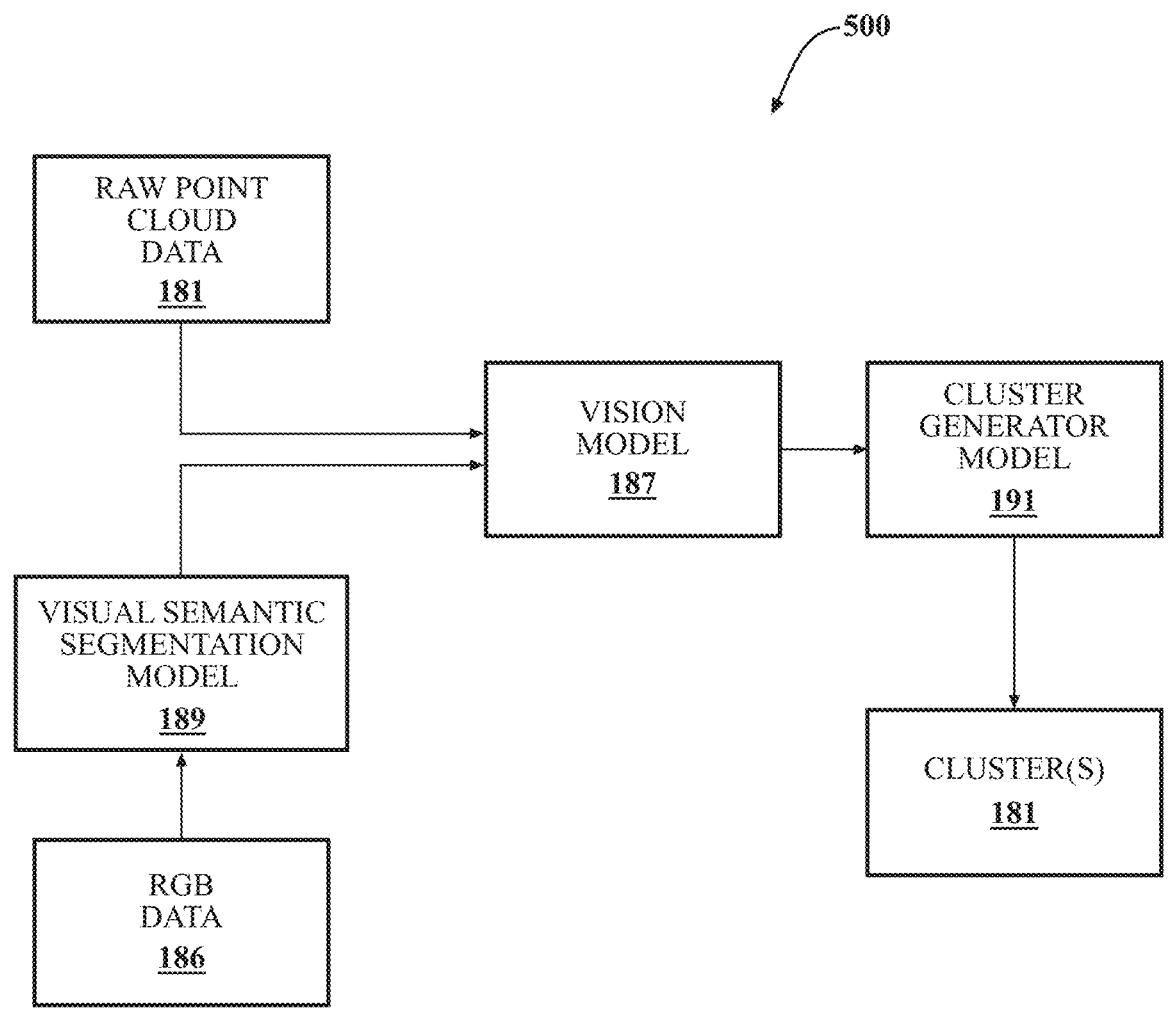
FIG. 5 illustrates a process flow of the object detection system in an inference mode.
Figure 6:
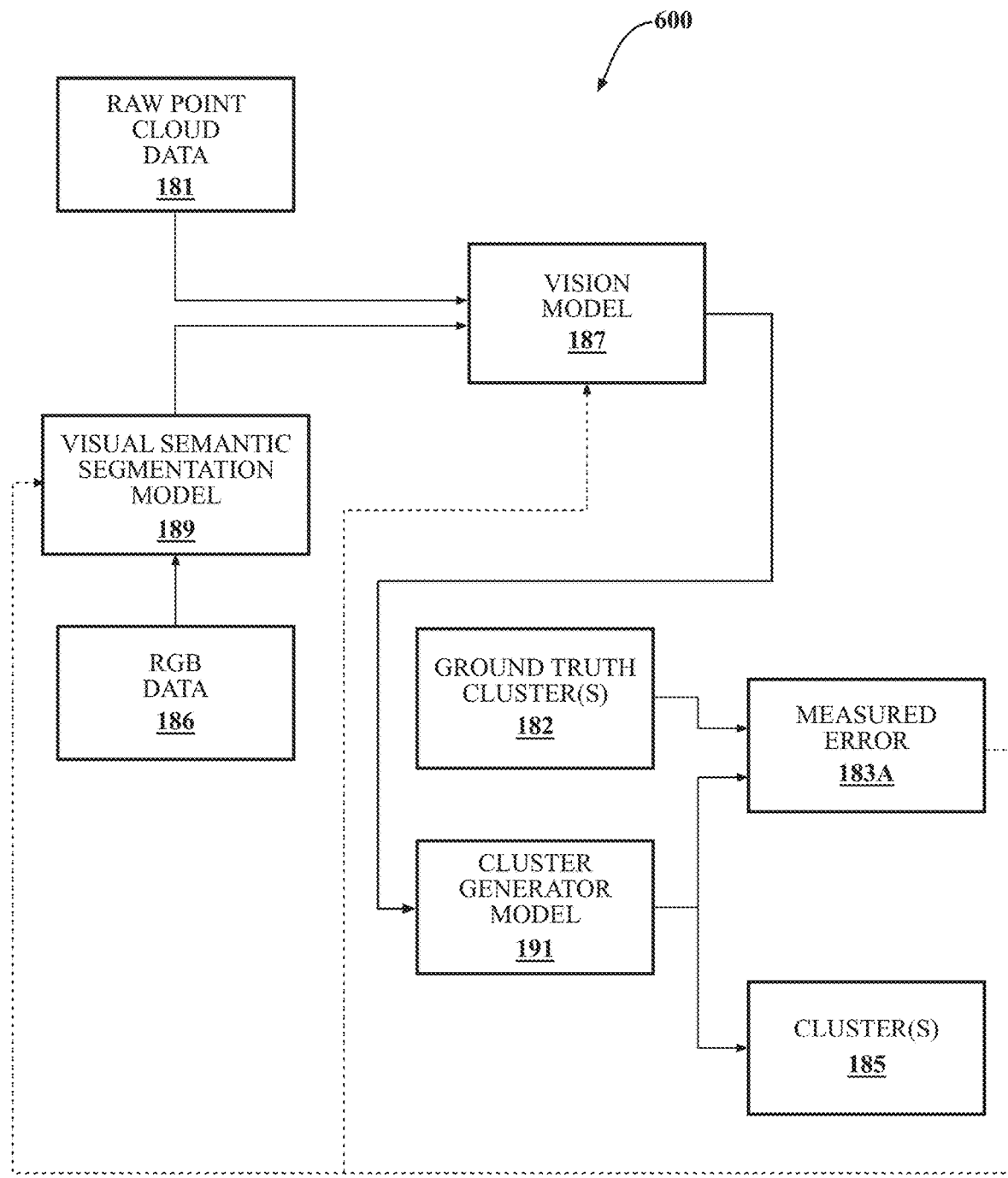
FIG. 6 illustrates a process flow training the vision model and/or visual semantic segmentation model of the object detection system using a clustering loss error.
Figure 7:
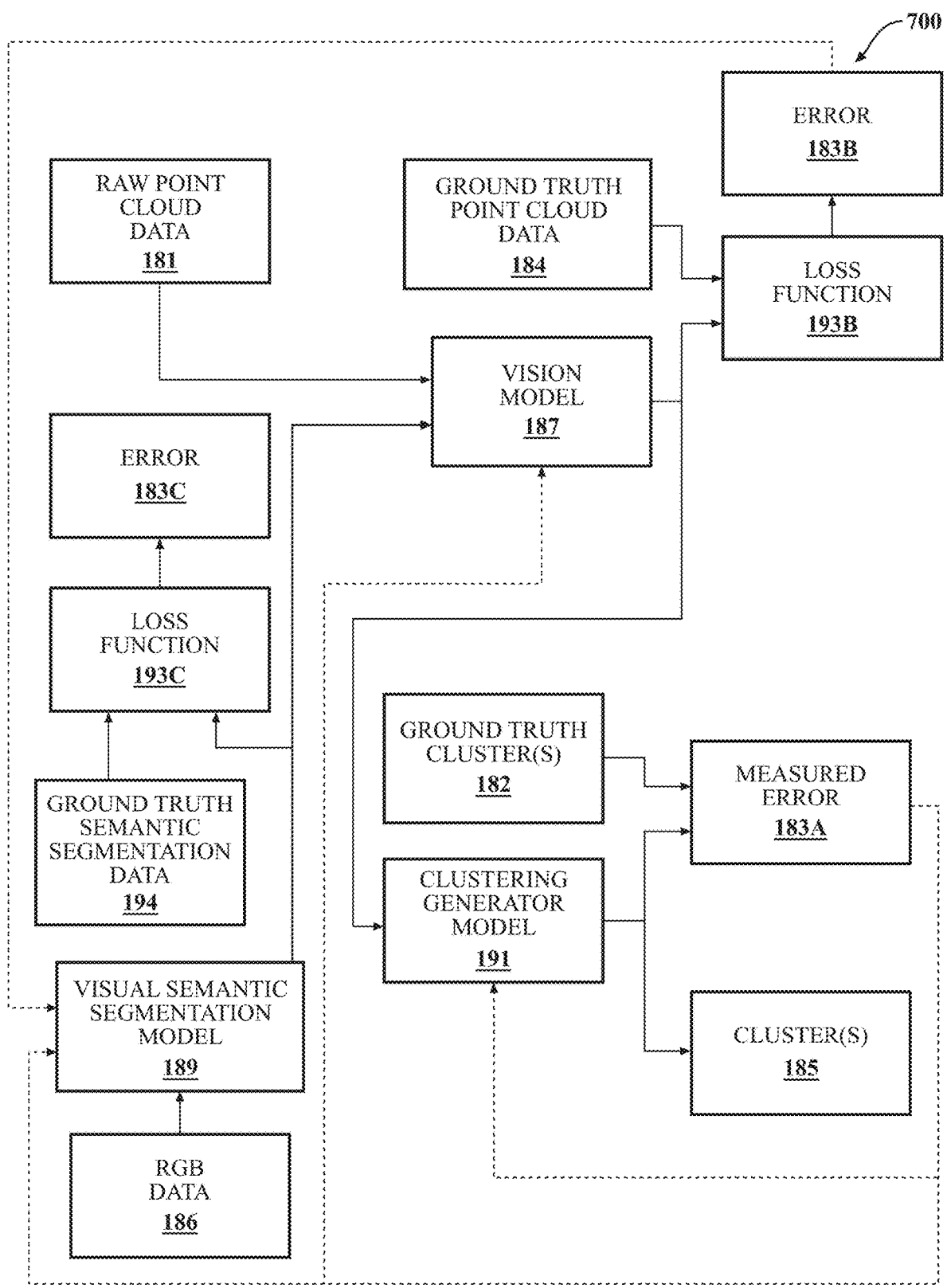
FIG. 7 illustrates a process flow training other models of the object detection system using other loss errors.

As such, referring to FIG. 5, a process flow 500 is shown indicating how the cluster(s) 185 are generated from the raw point cloud data 181 and the RGB data 186. As shown here, the visual semantic segmentation module 196 converts the RGB data into visual semantic segmentation data. The vision model 187 receives the raw point cloud data 181 and the visual semantic segmentation data from the visual semantic segmentation model 189. The vision model 187 then labels the points of the raw point cloud data 181 based on information received from the visual semantic segmentation model 189 to generate labeled point cloud data. This label point cloud data is then provided to the cluster generator model 191, which outputs the cluster(s) 185.

As such, the object detection system 170 utilizes three different neural networks, including the vision model 187, the visual semantic segmentation model 189, and the cluster generator model 191. The models 187, 189, and 191 include model weights 188, 190, and 191, respectively. As previously explained, the adjustment of these model weights impacts the performance of the models 187, 189, 191. The models 187, 189, and 191 may be trained using the training module 199.

Moreover, in one example, the training module 199 includes instructions that, when executed by the processor(s) 110, causes the processor(s) 110 to determine a clustering loss error between the one or more cluster(s) 185 generated by the cluster generator model 191 and one or more ground truth cluster(s) 182. For example, referring to FIG. 6, a process flow 600 for training the vision model 187 and/or the visual semantic segmentation model 189 is shown. The training module 199 utilizes a loss function to determine a measured error 183A by comparing the output by the object detection system in the form of the cluster(s) 185 with the ground truth cluster(s) 182. The training module 199 then causes the processor(s) 110 to adjust one or more model weights, such as the model weights of the 190 of the visual semantic segmentation model 189 and/or the model weights 188 of the vision model 187.

In some cases, the weights of a model, such as the vision model 187 and/or the visual semantic segmentation model 189, are adjusted by comparing what is directly output by the vision model 187 and/or the visual semantic segmentation model 189, respectively. Instead of directly measuring and determining a loss output by the vision model 187 and/or the visual semantic segmentation model 189, the process flow 600 takes a different approach, wherein the measured error 183A based on the loss between the cluster(s) 185 and the ground truth cluster(s) 182 is utilized instead. Essentially, by minimizing the measured error 183A by adjusting the model weights of upstream models, such as the vision model 187 and/or the visual semantic segmentation model 189, the downstream process of outputting the cluster(s) 185 can be optimized.

Another advantage of the process flow 600 is that obtaining ground truth training data for the vision model 187 and/or the visual semantic segmentation model 189 is considered expensive. Moreover, ground truth data for the vision model 187 would require annotated point cloud information, which is expensive and tedious to develop. Similarly, the visual semantic segmentation model 189 would require annotated semantic segmentation data, which is also expensive and tedious to develop. As such, the process flow 600 has the advantage of not requiring expensive and difficult to come by annotated training data to optimize the overall process.

For example, the process flow 700 shows different variations of how the models 187, 189, and/or 191 may be trained. As explained previously and shown in FIG. 6, the visual semantic segmentation model 189 and/or the vision model 187 may be trained based on the error 183A determined by comparing the cluster(s) 185 to the ground truth cluster(s) 182. The measured error 183A may also be utilized to train the clustering generator model 191. The vision model 187 could also be trained using ground truth labeled point cloud data 184 and determining an error output by the vision model 187 and the ground truth labeled point cloud data 184 using the loss function 193B to generate the error 183B. In addition to training the vision model 187, the error 183B could also be utilized to train the visual semantic segmentation model 189. In like manner, the visual semantic segmentation model 189 can also be trained by determining an error 183C by comparing ground truth semantic segmentation data 194 with the output of the visual semantic segmentation model 189.

However, stated before, the use of ground truth labeled point cloud data 184, ground truth semantic segmentation data 194 may not be necessary. As stated before, the ground truth labeled point cloud data 184 and the ground truth semantic segmentation data 194 is expensive and difficult to generate. As such, by utilizing the measured error 183A based on the ground truth cluster(s) 182 and the generated cluster(s) 185, the upstream processes of the vision model 187 and/or the visual semantic segmentation model 189 can have their model weights 188 and 190, respectively, adjusted to optimize the downstream process of generating the cluster(s) 185.

Figure 8:
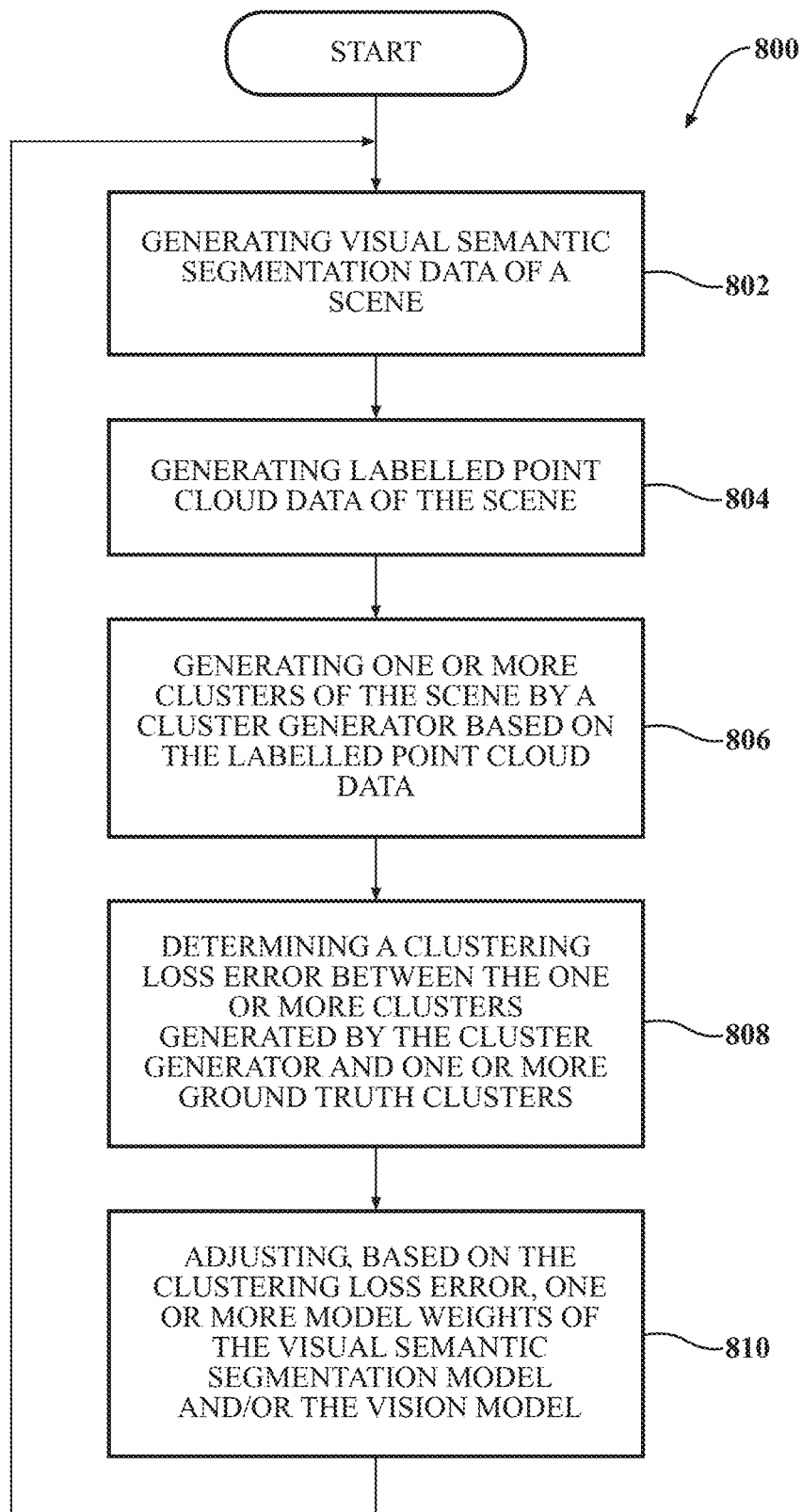
FIG. 8 illustrates a method for optimizing the performance of at least one downstream task of an object detection system.

Referring to FIG. 8, a method 800 for optimizing a downstream object detection process is shown. The method 800 will be described from the viewpoint of the vehicle 100 of FIG. 1 and the object detection system 170 of FIG. 2. However, it should be understood that this is just one example of implementing the method 800. While method 800 is discussed in combination with the object detection system 170, it should be appreciated that the method 800 is not limited to being implemented within the object detection system 170, but is instead one example of a system that may implement the method 800.

In step 802, the visual semantic segmentation module 196 includes instructions that, when executed by the processor(s) 110, causes the processor(s) 110 to generate visual semantic segmentation information. Moreover, semantic segmentation refers to the process of linking pixels in an image to one or more class labels. These class labels could include labels such as a vehicle, tree, ground plane, building, pedestrian, bicyclists, and the like. As such, the processor(s) 110 receives RGB data 186 that may be captured by the camera(s) 126 of a scene outside of the vehicle 100. The pixels of the image are then classified with a class label.

In step 804, the point cloud labeling module 197 causes the processor(s) 110 to generate labeled point cloud data of the scene by using a vision model 187. Moreover, the vision model 187 utilizes as inputs, raw point cloud data 181 of the scene and the visual semantic segmentation data generated by the visual semantic segmentation module 196. As stated before, the raw point cloud data 181 may be in the form of a point cloud generated by the LIDAR sensor(s) 124 but could also be in the form of pseudo-LIDAR data generated by performing one or more processes on images captured by the camera(s) 126.

In step 806, The cluster generator module 198 includes instructions that, when executed by the processor(s) 110, causes the processor(s) 110 to generate one or more clusters of the scene by a cluster generator model based on the labeled point cloud data. The cluster generator model 191 receives the labeled point cloud data and then generates one or more clusters, which may be in the form of one or more bounding boxes. The bounding boxes indicate the location of an object and also the class (or type) of the object.

In step 808, the training module 199 includes instructions that, when executed by the processor(s) 110, causes the processor(s) 110 to determine a clustering loss error between the one or more clusters generated by the cluster generator model 191 and one or more ground truth cluster(s) 182. The training module 199 utilizes a loss function to determine a measured error 183A by comparing what is output by the object detection system 170 in the form of the cluster(s) 185 with the ground truth cluster(s) 182.

In step 810, the training module 199 then causes the processor(s) 110 to adjust one or more model weights, such as the model weights of the 190 of the visual semantic segmentation model 189 and/or the model weights 188 of the vision model 187. By minimizing the measured error 183A by adjusting the model weights of upstream processes such as the vision model 187 and/or the visual semantic segmentation model 189, the downstream process of outputting the cluster(s) 185 can be optimized.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the object detection system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensor(s) 122 configured to acquire, and/or sense driving environment data. "Driving environment data" includes data or information about the external environment in which an autonomous vehicle is located or one or more portions thereof. For example, the one or more environment sensor(s) 122 can be configured to detect, quantify and/or sense obstacles in at least a portion of the external environment of the vehicle 100 and/or information/data about such obstacles. Such obstacles may be stationary objects and/or dynamic objects. The one or more environment sensor(s) 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensor(s) 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensor(s) 124, one or more sonar sensors 125, and/or one or more camera(s) 126. In one or more arrangements, the one or more camera(s) 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the object detection system 170, and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110, the object detection system 170, and/or the autonomous driving system 160 may control some or all of these vehicle systems 140 and, thus, may be partially or fully autonomous.

The processor(s) 110, the object detection system 170, and/or the autonomous driving system 160 can be operatively connected to communicate with the vehicle systems 140 and/or individual components thereof. For example, returning to FIG. 1, the processor(s) 110, the object detection system 170, and/or the autonomous driving system 160 can be in communication to send and/or receive information from the vehicle systems 140 to control the movement, speed, maneuvering, heading, direction, etc. of the vehicle 100. The processor(s) 110, the object detection system 170, and/or the autonomous driving system 160 may control some or all of these vehicle systems 140.

The processor(s) 110, the object detection system 170, and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110, the object detection system 170, and/or the autonomous driving system 160 can control the direction and/or speed of the vehicle 100.

The processor(s) 110, the object detection system 170, and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the object detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for optimizing performance of at least one downstream task, the system comprising:
   one or more processors; and
   a memory in communication with the one or more processors, the memory having:
      a visual semantic segmentation module having instructions that, when executed by the one or more processors, cause the one or more processors to generate visual semantic segmentation data of a scene by a visual semantic segmentation model based on at least one image of the scene,
      a point cloud labeling module having instructions that, when executed by the one or more processors, cause the one or more processors to generate labeled point cloud data of the scene by a vision model based on raw point cloud data of the scene and the visual semantic segmentation data;
      a clustering generator module having instructions that, when executed by the one or more processors, cause the one or more processors to generate one or more clusters of the scene by a cluster generator model based on the labeled point cloud data;
      a training module having instructions that, when executed by the one or more processors, cause the one or more processors to determine a clustering loss error between the one or more clusters generated by the cluster generator model and one or more ground truth clusters;
      the training module having instructions that, when executed by the one or more processors, cause the one or more processors to adjust, based on the clustering loss error, one or more model weights of at least one of: the visual semantic segmentation model and the vision model, and
      wherein the cluster generator model is separate from at least one of the vision model and the visual semantic segmentation model.

2. The system of claim 1, wherein:
   the training module further includes instructions that, when executed by the one or more processors, cause the one or more processors to determine a labeled point cloud data error between the labeled point cloud data and ground truth labeled point cloud data; and
   the training module further includes instructions that, when executed by the one or more processors, cause the one or more processors to adjust one or more model weights of the visual semantic segmentation model based on the labeled point cloud data error.

3. The system of claim 2, wherein:
   the training module further includes instructions that, when executed by the one or more processors, cause the one or more processors to determine a visual semantic segmentation data error between the visual semantic segmentation data and ground truth visual semantic segmentation data; and
   the training module further includes instructions that, when executed by the one or more processors, cause the one or more processors to adjust one or more model weights of the visual semantic segmentation model based on the visual semantic segmentation data error.

4. The system of claim 1, wherein the training module further includes instructions that, when executed by the one or more processors, cause the one or more processors to:
   determine a labeled point cloud data error between the labeled point cloud data and ground truth labeled point cloud data; and
   adjust one or more model weights of the vision model based on the labeled point cloud data error.

5. The system of claim 1, wherein the training module further includes instructions that, when executed by the one or more processors, cause the one or more processors to adjust one or more model weights of the cluster generator model based on clustering loss error.

6. The system of claim 1, wherein the one or more clusters are in the form of one or more bounding boxes.

7. The system of claim 1, wherein the raw point cloud data is one of: data from a LIDAR sensor and pseudo-LIDAR data.

8. A method for optimizing performance of at least one downstream task, the method comprising the step of:
   generating visual semantic segmentation data of a scene by a visual semantic segmentation model based on at least one image of the scene;
   generating labeled point cloud data of the scene by a vision model based on raw point cloud data of the scene and the visual semantic segmentation data;
   generating one or more clusters of the scene by a cluster generator model based on the labeled point cloud data;
   determining a clustering loss error between the one or more clusters generated by the cluster generator model and one or more ground truth clusters; and
   adjusting, based on the clustering loss error, one or more model weights of at least one of: the visual semantic segmentation model and the vision model, wherein the cluster generator model is separate from at least one of the vision model and the visual semantic segmentation model.

9. The method of claim 8, further comprising the steps of:
   determining a labeled point cloud data error between the labeled point cloud data and ground truth labeled point cloud data; and
   adjusting one or more model weights of the visual semantic segmentation model based on the labeled point cloud data error.

10. The method of claim 9, further comprising the steps of:
   determining a visual semantic segmentation data error between the visual semantic segmentation data and ground truth visual semantic segmentation data; and
   adjusting one or more model weights of the visual semantic segmentation model based on the visual semantic segmentation data error.

11. The method of claim 10, further comprising the steps of:

determining a labeled point cloud data error between the labeled point cloud data and ground truth labeled point cloud data; and adjusting one or more model weights of the vision model based on the labeled point cloud data error.

12. The method of claim 8, further comprising the step of adjusting one or more model weights of the cluster generator model based on clustering loss error.

13. The method of claim 8, wherein the one or more clusters are in the form of one or more bounding boxes.

14. The method of claim 8, wherein the raw point cloud data is one of: data from a LIDAR sensor and pseudo-LIDAR data.

15. A non-transitory computer-readable medium comprising instructions for optimizing performance of at least one downstream task that, when executed by one or more processors, cause the one or more processors to:

generate visual semantic segmentation data of a scene by a visual semantic segmentation model based on at least one image of the scene;

generate labeled point cloud data of the scene by a vision model based on raw point cloud data of the scene and the visual semantic segmentation data;

generate one or more clusters of the scene by a cluster generator model based on the labeled point cloud data;

determine a clustering loss error between the one or more clusters generated by the cluster generator model and one or more ground truth clusters; and adjust, based on the clustering loss error, one or more model weights of at least one of: the visual semantic segmentation model and the vision model, wherein the cluster generator model is separate from at least one of the vision model and the visual semantic segmentation model.

16. The non-transitory computer-readable medium of claim 15, further comprising instructions that, when executed by one or more processors, cause the one or more processors to:

determine a labeled point cloud data error between the labeled point cloud data and ground truth labeled point cloud data; and adjust one or more model weights of the visual semantic segmentation model based on the labeled point cloud data error.

17. The non-transitory computer-readable medium of claim 16, further comprising instructions that, when executed by one or more processors, cause the one or more processors to:

determine a visual semantic segmentation data error between the visual semantic segmentation data and ground truth visual semantic segmentation data; and adjust one or more model weights of the visual semantic segmentation model based on the visual semantic segmentation data error.

18. The non-transitory computer-readable medium of claim 15, further comprising instructions that, when executed by one or more processors, cause the one or more processors to:

determine a labeled point cloud data error between the labeled point cloud data and ground truth labeled point cloud data; and adjust one or more model weights of the vision model based on the labeled point cloud data error.

19. The non-transitory computer-readable medium of claim 15, further comprising instructions that, when executed by one or more processors, cause the one or more processors to adjust one or more model weights of the cluster generator model based on clustering loss error.

20. The non-transitory computer-readable medium of claim 15, wherein the raw point cloud data is one of: data from a LIDAR sensor and pseudo-LIDAR data.

* * * * *